(12) United States Patent
Dufner et al.

(10) Patent No.: US 6,617,068 B2
(45) Date of Patent: Sep. 9, 2003

(54) BI-ZONE WATER TRANSPORT PLATE FOR A FUEL CELL

(75) Inventors: Brian F. Dufner, West Hartford, CT (US); Michael L. Perry, South Glastonbury, CT (US); John C. Trocciola, Glastonbury, CT (US); Deliang Yang, Vernon, CT (US); Jung S. Yi, Mansfield, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 0 days.

(21) Appl. No.: 09/940,198

(22) Filed: Aug. 27, 2001

(65) Prior Publication Data

US 2003/0039877 A1 Feb. 27, 2003

(51) Int. Cl.[7] ................................................ H01M 2/02
(52) U.S. Cl. .............................. 429/34; 429/12; 429/13; 429/35; 429/38
(58) Field of Search .............................. 429/12, 13, 34, 429/35, 38

(56) References Cited

U.S. PATENT DOCUMENTS

| | | |
|---|---|---|
| 4,177,159 A | 12/1979 | Singer |
| 4,652,502 A | 3/1987 | Breault et al. |
| 4,756,981 A | 7/1988 | Breault et al. |
| 4,824,739 A * | 4/1989 | Breault et al. ................. 429/13 |
| 5,264,299 A | 11/1993 | Krasij et al. |
| 5,523,175 A | 6/1996 | Beal et al. |
| 5,840,414 A | 11/1998 | Bett et al. |
| 6,024,848 A | 2/2000 | Dufner et al. |
| 6,159,628 A | 12/2000 | Grasso et al. |
| 6,165,634 A | 12/2000 | Krasij et al. |

OTHER PUBLICATIONS

Rennie & Clifford, "Melting Ice In Porous Solids", from "Journal of the Chemical Society, Faraday Transactions", (Cont.), at vol. 73 (1977), at pp. 680–682.

* cited by examiner

Primary Examiner—Carol Chaney
Assistant Examiner—Dah-Wei D. Yuan
(74) Attorney, Agent, or Firm—Malcom J. Chisholm, Jr.

(57) ABSTRACT

The invention is a bi-zone water transport plate for a fuel cell wherein the plate includes a water permeability zone and a bubble barrier zone. The bubble barrier zone extends between all reactive perimeters of the plate, has a pore size of less than 20 microns, and has a thickness of less than 25 percent of a shortest distance between opposed contact surfaces of the plate. The water permeability zone has a pore size of at least 100 percent greater than the pore size of the bubble barrier zone, and has a thickness of greater than 75 percent of the shortest distance between the opposed contact surfaces of the plate. By having a separate bubble barrier zone, the plate affords enhanced water permeability while the bubble barrier maintains a gas seal.

21 Claims, 4 Drawing Sheets

BI-ZONE WATER TRANSPORT PLATE FOR A FUEL CELL

TECHNICAL FIELD

The present invention relates to fuel cells that are suited for usage in transportation vehicles, portable power plants, or as stationary power plants, and the invention especially relates to a bi-zone water transport plate that may be used within a fuel cell for transporting reactant, product and coolant fluids to, through and from the fuel cell, for conducting electricity from one cell to an adjacent cell, for providing a barrier to transfer of gaseous reactants between adjacent cells, and/or for providing mechanical integrity to the fuel cell.

BACKGROUND OF THE INVENTION

Fuel cells are well-known and are commonly used to produce electrical energy from reducing and oxidizing reactants fluids to power electrical apparatus such as apparatus on-board space vehicles, or on-site generators for buildings. A plurality of planar fuel cells are typically arranged in a stack surrounded by an electrically insulating frame structure that defines manifolds for directing flow of reducing, oxidant, coolant and product fluids as part of a fuel cell power plant. Each individual fuel cell generally includes an anode electrode and a cathode electrode separated by an electrolyte. A reducing fluid such as hydrogen is supplied to the anode electrode, and an oxidant such as oxygen or air is supplied to the cathode electrode. In a cell utilizing a proton exchange membrane ("PEM") as the electrolyte, the hydrogen electrochemically reacts at a catalyst surface of the anode electrode to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy.

It is known to utilize one component of a fuel cell to assist in the accomplishment of a variety of water management and related tasks. Such a component is typically formed of a porous carbon body and is commonly referred to under various names including "cooler plate", "water transport plate", "separator plate", "bi-polar plate", "end plate", among other names. For example, in U.S. Pat. No. 6,024,848 that issued on Feb. 15, 2000 to Dufner et al., which patent is owned by the assignee of all rights in the present invention and which patent is hereby incorporated herein by reference, a water transport plate is shown that defines a plurality of coolant water feed channels on a planar surface of the plate and on an opposed surface a network of reactant gas distribution channels is defined. Such a water transport plate is typically a porous carbon body and the plate must perform a variety of functions. It must transport water from coolant channels through the body to gaseous reactant channels to humidify a reactant fluid within the gas reactant channels; it must remove product water generated at the cathode electrode across the body into the coolant water channels to prevent flooding of the cathode electrode; it must form a gaseous barrier to prevent mixing of fuel and oxidant reactant fluids on opposed sides of the plate; it must conduct electricity or electrons from one cell to an adjacent fuel cell in a fuel cell stack assembly; it must conduct waste heat generated within the fuel cell to the coolant fluid; it may provide a distribution network for oxidant and reducing fluid reactants; and, it must provide mechanical support and integrity to the fuel cell.

Therefore, such a water transport plate must be porous, wettable to water, have a high rate of water permeability and have a high bubble pressure. However, characteristics of the water transport plate that are appropriate for a high bubble pressure, are inconsistent with characteristics appropriate for a high rate of water permeability. For example, to increase bubble pressure to thereby enhance a gaseous seal between gaseous oxidant and fuel reactants on opposed sides of the water transport plate, it is appropriate to have a small pore size of the pores within the plate. However, to enhance permeability of the body to coolant or product water, it is desirable to have a large pore size or pore diameter. Known fuel cell water transport plates have a generally uniform pore size, and the pore size is typically determined as a compromise between requirements for water permeability based upon plate thickness and an area of contact surfaces of the plate and requirements for bubble pressure based upon a maximum operational pressure differential between fluids passing within flow fields adjacent opposed contact surfaces of the plate.

Accordingly, there is a need for a water transport plate for a fuel cell that provides for increased bubble pressure and water permeability of the plate.

DISCLOSURE OF THE INVENTION

The invention is a bi-zone water transport plate for a fuel cell wherein the bi-zone water transport plate is secured in fluid communication with a catalyst of the fuel cell. The bi-zone water transport plate includes a water permeability zone and a bubble barrier zone, wherein the bubble barrier zone extends between all reactive perimeters of the plate, has a pore size of less than 20 microns, and has a thickness of less than 25 percent of a shortest distance between opposed contact surfaces of the plate, and wherein the water permeability zone has a pore size of at least 100 percent greater than the pore size of the bubble barrier zone, and has a thickness of greater than 75 percent of the shortest distance between the opposed contact surfaces of the plate. These thickness ratios are selected to maximize the water permeability through the bubble barrier zone while minimizing a water inventory of the water permeability zone.

In a preferred embodiment, the bubble barrier zone has a pore size of less than 5 microns, a thickness of between about 0.010–0.025 centimeters, and the water permeability zone has a pore size of between about 10–20 microns and a thickness of between about 0.075–0.200 centimeters. In an alternative embodiment, a cathode or an anode substrate is disposed between the bi-zone water transport plate and in a cathode or anode catalyst of the fuel cell, the pore size of the water permeability zone is about 40 percent of the pore size of the cathode or anode substrate, and the pore size of the bubble barrier zone is about 20 to 50 percent of the pore size of the water permeability zone.

Additionally, the bubble barrier zone may be defined on either of the opposed contact surfaces of the bi-zone water transport plate, or may be defined within the plate between portions of the water permeability zone. The bubble barrier zone may also overlie an entire perimeter edge of the bi-zone water transport plate to form an edge seal of the plate.

Accordingly, it is a general object of the present invention to provide a bi-zone water transport plate for a fuel cell that overcomes deficiencies of prior art water transport plates for fuel cells.

It is a more specific object to provide a bi-zone water transport plate for a fuel cell that enhances both bubble pressure and water permeability of the plate.

It is yet another object to provide a bi-zone water transport plate for a fuel cell that may provide gaseous fluid sealing at either of opposed contact surfaces of the plate or at a middle portion of the plate.

It is still a further object to provide a bi-zone water transport plate for a fuel cell that provides for edge sealing of the plate with a bubble barrier zone.

It is yet another object to provide a bi-zone water transport plate for a fuel cell that depresses a freezing temperature of water remaining within the bi-zone water transport plate.

These and other objects and advantages of this invention will become more readily apparent when the following description is read in conjunction with the accompanying drawings.

DESCRIPTION OF THE PREFERRED EMBODIMENTS

Figure 1:
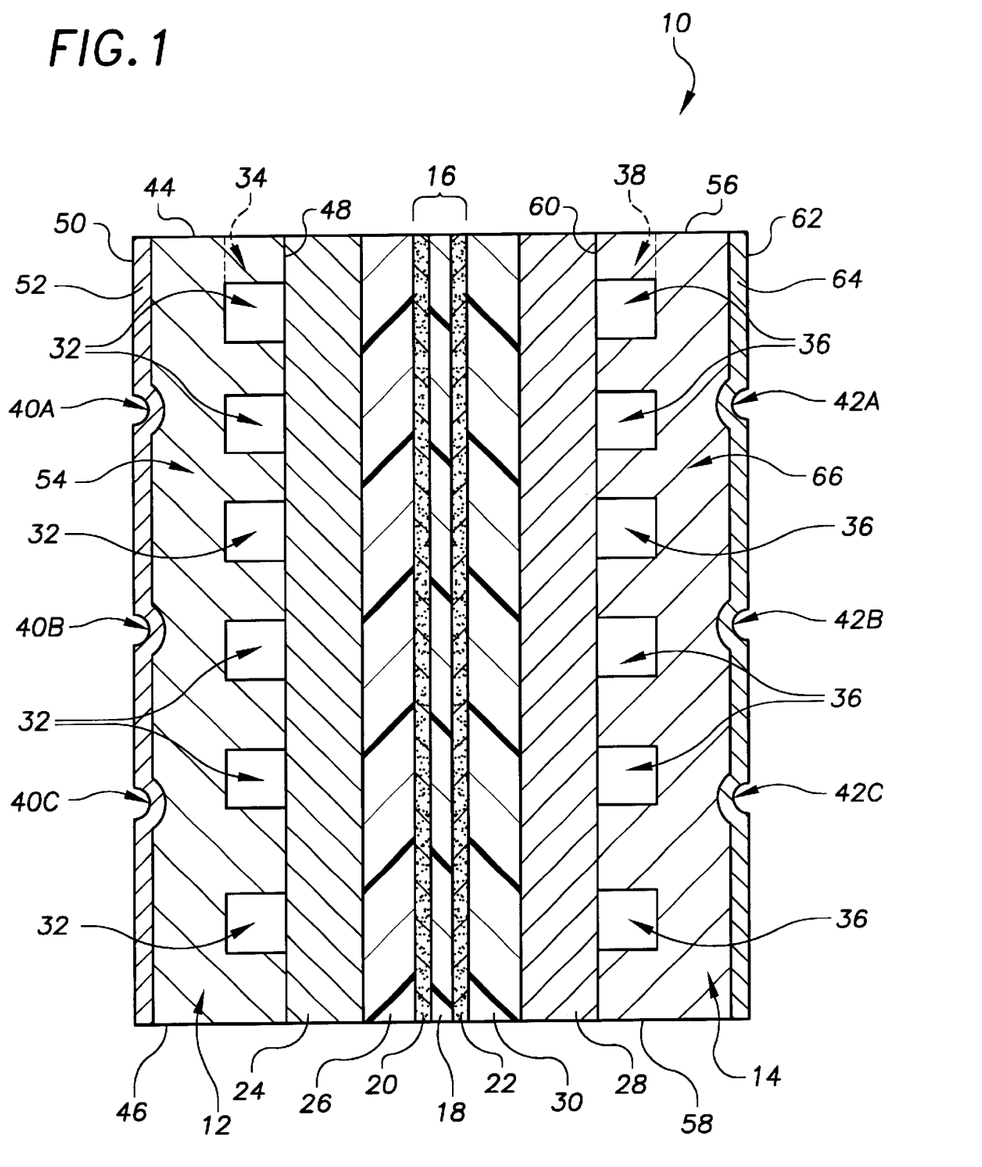
FIG. 1 is a cross-sectional, schematic representation of a fuel cell employing a bi-zone water transport plate constructed in accordance with the present invention.

Referring to the drawings in detail, FIG. 1 shows a schematic, cross-sectional representation of a fuel cell means for generating electrical energy from process oxidant and reducing fluid reactant streams that is generally designated by the reference numeral 10. The fuel cell 10 has a bi-zone water transport plate constructed in accordance with the present invention in the form of a first or anode bi-zone water transport plate 12 and a second or cathode bi-zone water transport plate 14. The anode and cathode bi-zone water transport plates 12, 14 are at opposed sides of the fuel cell 10, which also includes a membrane electrode assembly ("M.E.A.") 16 that consists of an electrolyte such as a proton exchange membrane ("PEM") 18, an anode catalyst 20 and a cathode catalyst 22 secured on opposed sides of the electrolyte 18. The bi-zone water transport plates 12, 14 are secured in fluid communication with the electrolyte 18 and catalysts 20, 22.

The fuel cell 10 may also include an anode support means that is secured between and in fluid communication with the anode catalyst 20 and the anode bi-zone water transport plate 12 for passing a reducing fluid or fuel stream adjacent the anode catalyst 20. The anode support means may include one or more porous layers, any one or all of which may be wetproofed, as is well known in the art, such as a porous anode substrate 24 and a porous anode diffusion layer 26. Similarly, the fuel cell may also include a cathode support means that is secured between and in fluid communication with the cathode catalyst 22 and the cathode bi-zone water transport plate 14 for passing a process oxidant stream adjacent the cathode catalyst 22. The cathode support means may include one or more porous layers, any one or all of which may be wetproofed, as is well known in the art, such as a porous cathode substrate 28, and a porous cathode diffusion layer 30. As described in the aforesaid U.S. Pat. No. 6,024,848, the anode and cathode support means may be one or more layers of carbon-carbon fibrous composites that may be wetproofed with a hydrophobic substance such as "TEFLON" (a trademark of the DuPont Company, of Delaware, U.S.A.), in a manner well-known in the art.

The anode bi-zone water transport plate 12 defines a plurality of fuel flow channels 32 that are in fluid communication with each other and with a fuel inlet 34 that receives the reducing fluid so that the fuel inlet 34 and flow channels 32 cooperate to pass the reducing fluid fuel through the fuel cell 10 in fluid communication with the anode catalyst 20. Similarly, the cathode water transport plate 14 defines a plurality of oxidant flow channels 36 that are in fluid communication with each other and with an oxidant inlet 38 that receives the process oxidant so that the oxidant inlet 38 and oxidant flow channels 36 cooperate to pass the process oxidant through the fuel cell 12 in fluid communication with the cathode catalyst 22. It is pointed out that the plurality of fuel flow channels 32 are often characterized as an "anode flow field" secured adjacent the anode catalyst, and the anode flow field may include the pore volume of the anode diffusion layer 26 and anode substrate 24. Similarly, the plurality of oxidant flow channels 36 may be characterized as a "cathode flow field", and may also include the pore volume of the cathode diffusion layer 30 and cathode substrate 28.

In alternative fuel cell means, the anode and cathode flow fields may be formed instead by cavities, differing channel or groove configurations well known in the art and defined within fuel cell components to direct the fuel and oxidant reactant streams to pass adjacent the anode and cathode catalysts 20, 22. The anode bi-zone water transport plate 12 also includes a plurality of anode coolant channels 40A, 40B, 40C that deliver and remove a coolant stream to and from the plate 12, and similarly, the cathode bi-zone water transport plate 14 includes a plurality of cathode coolant channels 42A, 42B, 42C that deliver and remove a coolant stream to and from the plate 14. As shown in FIG. 1, the anode and cathode water transport plates 12, 14 may be structured to cooperate with adjacent bi-zone water transport plates (not shown) of adjacent fuel cells in a fuel cell stack assembly (not shown), so that the anode coolant channels 40A, 40B, 40C may cooperate in mirror-image association with coolant channels in water transport plates of an adjacent fuel cell (not shown) to form a network of coolant channels for delivering a coolant stream to the anode and cathode bi-zone water transport plates 12, 14.

As shown in FIG. 1, the anode bi-zone water transport plate 12 includes a first perimeter edge 44, an opposed second perimeter edge 46, a first contact surface 48 and an opposed second contact surface 50. The phrase "perimeter edge" is defined for purposes herein as a physical terminus of the anode and/or cathode bi-zone water transport plate. The phrase "contact surface" is defined for purposes herein as being a surface of the anode or cathode bi-zone water transport plate that is in contact with an adjacent component of the fuel cell 10 and that is a farthest distance from an opposed contact surface of the same water transport plate. For example, the first contact surface 48 of the anode bi-zone water transport plate 12 is in contact with the anode substrate 24 and extends between the first and second perimeter edges 44, 46 of the anode bi-zone water transport plate 12, but does not include any interior surfaces of the fuel flow channels 32 of the plate 12 because such surfaces are not a farthest distance from the opposed second contact surface 50 of the anode bi-zone water transport plate 12. These definitions of the opposed first and second contact surfaces 48, 50 of the anode bi-zone water transport plate are presented to provide for relative dimensional limitations of elements of bi-zone water transport plates of the present invention as described below. The anode bi-zone water transport plate 12 also includes a bubble barrier zone 52 that extends between the first and second perimeter edges 44, 46 adjacent the second contact surface 50 of the plate 12, and between the opposed second and first contact surfaces 50, 48 of the plate 12. The anode bi-zone water transport plate 12 also includes a water permeability zone 54 secured to the bubble barrier zone 52 that extends between the first and second perimeter edges 44, 46 of the plate 12 adjacent the first contact surface 48 and between the opposed first and second contact surfaces 48, 50 of the plate 12.

As shown in FIG. 1, the cathode bi-zone water transport plate 14 also includes a first perimeter edge 56, an opposed second perimeter edge 58, a first contact surface 60 and an opposed second contact surface 62. The cathode bi-zone water transport plate 14 also includes a bubble barrier zone 64 that extends between the first and second perimeter edges 56, 58 adjacent the second contact surface 62 of the plate 14, and between the opposed second and first contact surfaces 62, 60 of the plate 14. The cathode bi-zone water transport plate 14 also includes a water permeability zone 66 that extends between the first and second perimeter edges 56, 58 of the plate 14 adjacent the first contact surface 60 and between the opposed first and second contact surfaces 60, 62 of the plate 14.

Figure 2:
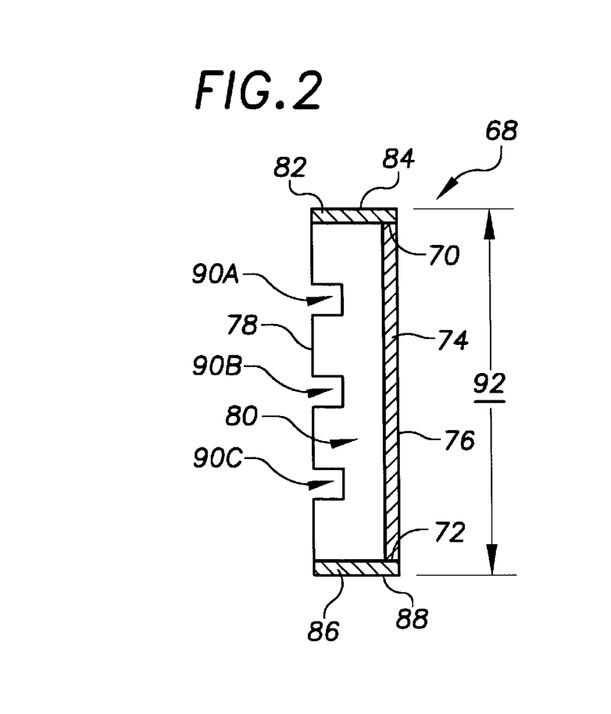
FIG. 2 is cross-sectional, schematic of a first alternative embodiment of a bi-zone water transport plate.

FIGS. 2 shows a first alternative embodiment 68 of bi-zone water transport plate of the present invention wherein the plate 68 includes a first reactive perimeter 70 and an opposed second reactive perimeter 72. A bubble barrier zone 74 of the first alternative embodiment of the plate 68 extends between the first and second reactive perimeters 70, 72 adjacent a first contact surface 76 of the plate 68 and between the first contact surface 76 and an opposed second contact surface 78. A water permeability zone 80 also extends between the first and second reactive perimeters 70, 72 adjacent the second contact surface 78, and between the second contact surface 78 and the first contact surface 76. A first edge seal 82 extends between the first reactive perimeter 70 and a first perimeter edge 84 of the first alternative embodiment of a bi-zone water transport plate 68 and a second edge seal 86 extends between the second reactive perimeter 72 and a second perimeter edge 88 of the plate 68. It is known to create edge seals, such as the first and second edge seals 82, 82, 86, in porous fuel cell components by impregnating or coating perimeter edges with resins, polymers, and elastomers as shown in U.S. Pat. Nos. 6,165,634, 6,159,628, 5,523,175 and 5,264,299, all of which Patents are owned by the assignee of all rights in the present bi-zone water transport plate. The plate 68 may also include a plurality of fuel or oxidant flow channels 90A, 90B, 90C, as shown in FIG. 2.

The first and second reactive perimeters 70, 72 serve to define between the perimeters 70, 72 a reactive area 92 of the first alternative embodiment of the bi-zone water transport plate 68. During operation of the fuel cell 10, gaseous reactants do not flow through the bubble barrier zone 74, and do not flow through the edge seals 82, 86. Additionally, during operation of the fuel cell 10, product water may flow through the water permeability zone 80 and the bubble barrier zone 74. In the embodiments of the bi-zone water transport plate 10 shown in FIG. 1, and in FIGS. 3–7, the perimeter edges 44, 46, 56, 58 coincide with reactive perimeters. However, in some embodiments of the bi-zone water transport plate 10, it is possible that an edge seal, such as the first and second edge seals 82, 86 of the first alternative embodiment of the plate 68, may seal all pore spaces of the plate 68 thereby interrupting flow through the edge seals 82, 86 of any fluids. In such embodiments, it is unnecessary for the bubble barrier zone to extend all the way between the perimeter edges 84, 88 of the plate 68, and therefore the bubble barrier zone only extends between the reactive perimeters 70, 72. By characterizing the bubble barrier zone 74 as extending between all reactive perimeters of the bi-zone water transport plate 68, it is meant that the bubble barrier zone completely overlies the reactive area 92 of the plate 68, so that when pores of the bubble barrier zone 74 are filled with a liquid, movement of a gaseous fluid through the bi-zone water transport plate 68 is blocked, thereby forming a gaseous seal of the reactive area 92 of the bi-zone water transport plate 68.

Figure 3:
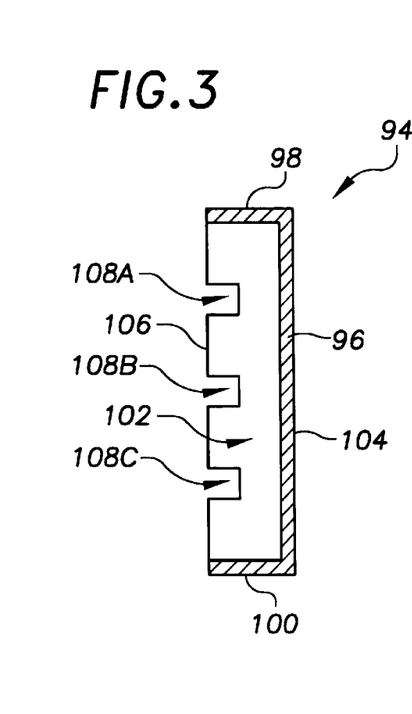
FIG. 3 is a cross-sectional, schematic of a second alternative embodiment of a bi-zone water transport plate.

In FIG. 3, a second alternative embodiment 94 of the bi-zone water transport plate is shown wherein a bubble barrier zone 96 extends between a first perimeter edge 98 and a second perimeter edge 100 and the bubble barrier zone also completely overlies both the first and second perimeter edges 98, 100 to form an edge seal of the plate 94. The second alternative bi-zone water transport plate 94 also includes a water permeability zone 102 between a first contact surface 104, and adjacent an opposed second contact surface 106, and a plurality of fuel or oxidant flow channels 108A, 108B, 108C.

Figure 4:
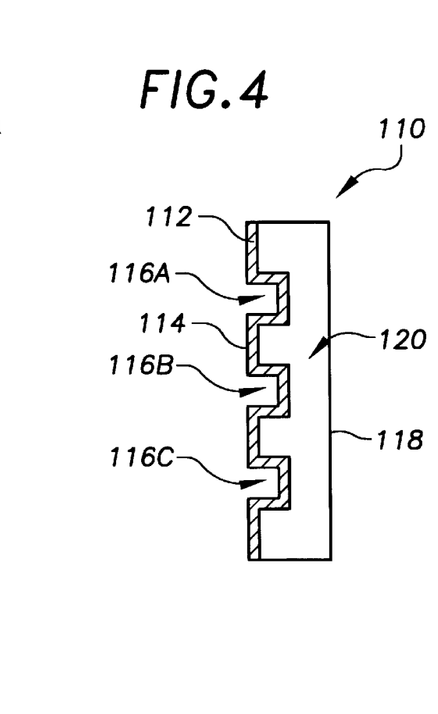
FIG. 4 is a cross-sectional, schematic of a third alternative embodiment of a bi-zone water transport plate.
Figure 5:
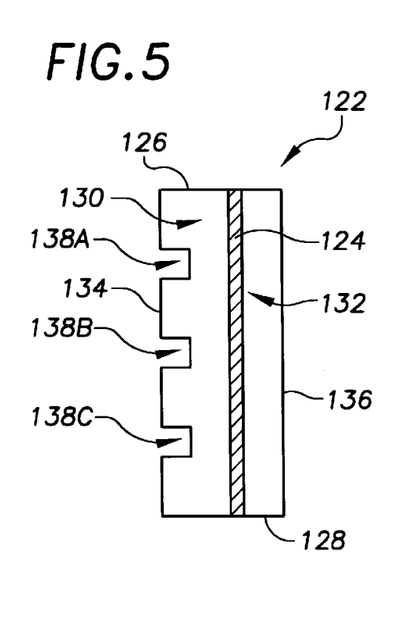
FIG. 5 is a cross-sectional, schematic of a fourth alternative embodiment of a bi-zone water transport plate.

As shown in FIG. 4, a third alternative embodiment 110 of a bi-zone water transport plate may have a bubble barrier zone 112 covering a first contact surface 114 that also defines a plurality of fuel or oxidant channels 116A, 116B, 116C, opposed to a second contact surface 118. A water permeability zone 120 extends between the bubble barrier zone 112 and the second contact surface 118. FIG. 5 shows a fourth alternative embodiment 122 of a bi-zone water transport plate, wherein the bubble barrier zone 124 extends between a first reactive perimeter 126 and a second reactive perimeter 128, and is also disposed between a first water permeability zone portion 130 and a second water permeability zone portion 132. The first water permeability zone portion 130 also defines a first contact surface 134, the second water permeability zone portion 132 defines a second contact surface 136, and the first and second water permeability zone portions 130, 132 and the bubble barrier zone are all disposed between the first and second contact surfaces 134, 136.

Figure 6:
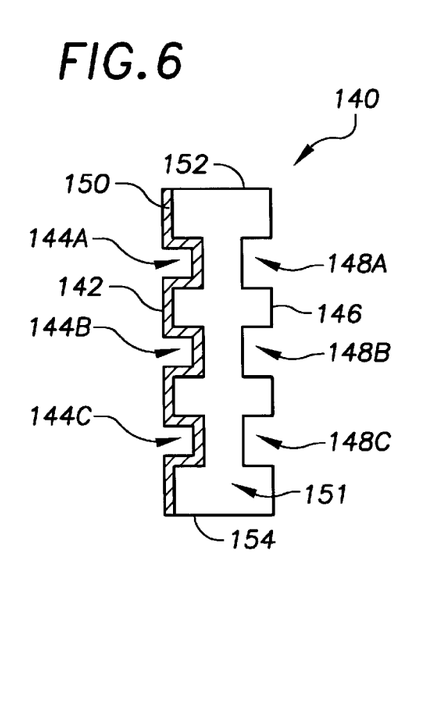
FIG. 6 is a cross-sectional, schematic of a fifth alternative embodiment of a bi-zone water transport plate.

FIG. 6 shows a fifth alternative embodiment 140 of a bi-zone water transport plate wherein a first contact surface 142 defines a plurality of reactant flow channels, such as oxidant flow channels 144A, 144B, 144C, and an opposed second contact surface 146 defines a plurality of fuel flow channels 148A, 148B, 148C, and a bubble barrier zone 150 is defined adjacent only one of the two opposed contact surfaces 142, 146, such as adjacent the first contact surface 142 and the oxidant flow channels 144A, 144B, 144C defined therein, while a water permeability zone 151 extends from the bubble barrier zone 150 to the second contact surface 146. The bubble barrier zone 150 also extends between a first reactive perimeter 152 and an opposed second reactive perimeter 154. It is pointed out again that the first and second contact surfaces 142, 146 include a surface of the bi-zone water transport plate 140 that is capable of being disposed in contact with an adjacent component of a fuel cell and that is a farthest distance from an opposed contact surface of the plate 140, and hence the first and second contact surfaces 142, 146 do not include interior surfaces of the oxidant flow channels 144A, 144B, 144C or the fuel flow channels 148A, 148B, 148C.

Figure 7:
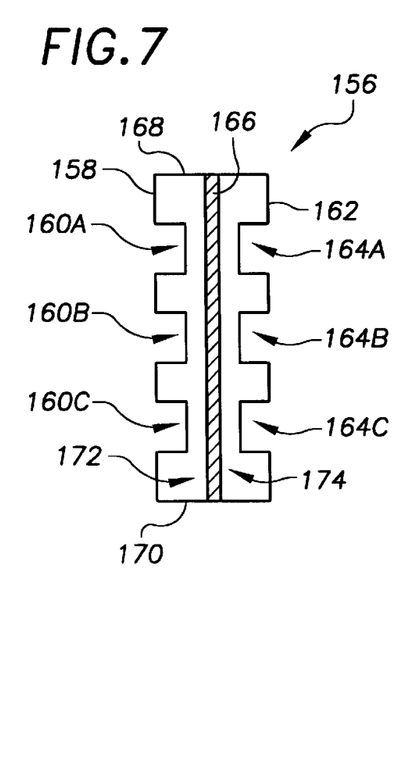
FIG. 7 is a cross-sectional, schematic of a sixth alternative embodiment of a bi-zone water transport plate.

A sixth alternative embodiment 156 of a bi-zone water transport plate is shown in FIG. 7, that, like the fifth embodiment 140, includes a first contact surface 158 that defines a plurality of oxidant flow channels 160A, 160B, 160C, and an opposed second contact surface 162 that includes a plurality of fuel flow channels 164A, 164B, 164C. A bubble barrier zone 166 extends from a first reactive perimeter 168 to a second reactive perimeter 170, and between a first water permeability zone portion 172 and a second water permeability zone portion 174. It is stressed that the aforesaid FIG. 1 embodiment and the six alternative embodiments shown in FIGS. 2–7 show only schematic representations of bi-zone water transport plates having opposed perimeter edges or reactive perimeters. However, in the disclosed embodiments, the bubble barrier zone extends between all reactive perimeters to cover an entire reactive area of the plate and to thereby block passage of all gaseous fluids through the plates whenever the pores in the bubble barrier zone are filled with a liquid.

The bubble barrier zones of all the aforesaid embodiments, such as the bubble barrier zone 74 of the first alternative embodiment 68 of a bi-zone water transport plate shown in FIG. 2, extends between all reactive perimeters of the plate 68, has a pore size of less than 20 microns, and has a thickness of less than 25 percent of a shortest distance between opposed contact surfaces of the plate 68. The water permeability zone 80 has a pore size of at least 100 percent greater than a pore size of the bubble barrier zone 74 and has a thickness of greater than 75 percent of the shortest distance between the opposed contact surfaces of the plate 68. In a preferred embodiment, the bubble barrier zone has a pore size of less than 5 microns, a thickness of about 0.010–0.025 centimeters, and the water permeability zone has a pore size of between about 10–20 microns and a thickness of about 0.075–0.200 centimeters. In a further preferred embodiment such as shown in FIG. 1, the anode bi-zone water transport plate 12, may be disposed adjacent an electrode substrate, such as the anode substrate 24, and the pore size of the water permeability zone 54 is about 40 percent of the pore size of the electrode substrate, and the pore size of the bubble barrier zone is about 25 to 50 percent of the pore size of the water permeability zone.

For purposes herein, the phrase "thickness of the bubble barrier zone" is meant to describe a shortest distance across the bubble barrier zone that a fluid must pass to move in a direction from one contact surface of the plate to an opposed contact surface. For example, in the embodiments shown in FIGS. 1, 2, 3, 5 and 7, the bubble barrier zones are shown as virtually parallel to planes defined by the respective contact surfaces of those embodiments, and the thicknesses of the bubble barrier zones of those embodiments would be a shortest distance across the zones in a direction parallel to a shortest distance between the opposed contact surfaces. However, in the embodiments shown in FIGS. 4 and 6, the thickness of the bubble barrier zones of those embodiments is the shortest distance a fluid must pass to cross the bubble barrier zone, and therefore a portion of the bubble barrier zone along an inside surface of the fuel or oxidant channels that is perpendicular to a plane defined by a contact surface is not a thickness of the bubble barrier zone. A shortest distance a fluid must pass across that perpendicular portion is the "thickness of the bubble barrier zone". Similarly, a "thickness of the water permeability zone" is a shortest distance a fluid must pass through the water permeability zone to pass in a direction from one contact surface toward an opposed contact surface.

The bi-zone water transport plate 68 of FIG. 2 and the other embodiments described herein may be manufactured of any materials well-known in the art to be compatible with a proton exchange membrane ("PEM") fuel cell working environment, such as well known graphite or graphite-polymer porous carbon bodies. It is well known to form by compression or injection molding a porous carbon body plate of the preferred pore size of the water permeability zone 80, and any required reactant or coolant flow channels may be molded or machined directly into the plate 68.

The bubble barrier zone 74 may be formed and applied to the plate 68 by a variety of methods. For example, in U.S. Pat. No. 4,652,502 that issued on Mar. 24, 1987 and is owned by the assignee of all rights in the present bi-zone water transport plate, and which patent is hereby incorporated herein by reference, materials, apparatus and methods are disclosed for forming an edge seal on porous plates in a phosphoric acid fuel cell, for example starting at Column 5, line 63 to Column 10, line 19. In essence an apparatus is described that supports a porous plate between a flow cavity and a vacuum source, and a precursor sealing material in the form of a concentrated aqueous suspension is extruded under pressure greater than ten pounds per square inch ("p.s.i.") from the flow cavity to the edge region of the plate to be sealed while the vacuum source applies a suction pressure to draw the suspension through the plate. The sealing material may be an inert powder disposed within the water selected from the group consisting of silicon carbide, carbon, graphite, or mixtures thereof, having a low structure which is less than or equal to fifty milliliters per hundred grams and a particle size that is less than or equal to one micron. After the void volume of the porous plate to be sealed is filled with the sealing material, the liquid water is removed. The solids content of the suspension is of an amount which avoids a gross volume reduction of the sealing material in the void volume of the plate after the liquid is removed. It has been found that a solids content in the suspension that is greater than sixty percent by weight of the suspension avoids a gross volume reduction upon removal of the liquid water.

Using such materials and apparatus, the bubble barrier zone 74 may be applied to the water transport plate 68 to cover the entire reactive area 92 of the first contact surface 76 of the plate 68, so that the depth of the bubble barrier zone is less than 25 percent of a shortest distance between opposed first and second contact surfaces 76, 78.

A first preferred or carbon polymer mixture bubble barrier zone 74 may be formed from a carbon black, or a graphitized carbon black mixed with any polymer binder that is compatible with the working environment of a PEM fuel cell. An acceptable carbon black is sold under the designation "VULCAN XC-72", manufactured by Cabot Corporation, of Boston, Mass. Acceptable polymer binders include polytetrafluoroethylene (as sold under the trademark "TEFLON" by the E.I. DuPont de Nemour Company of Willmington, Del.), perfluorosulfonic acid (as sold under the trademark "NAFION" by the E.I. DuPont de Nemour Company), phenolic, epoxy, polysulfone, and polyvinylidine fluoride. U.S. Pat. No. 4,756,981 that issued to Breault et al. on Jul. 12, 1988, which patent is owned by the assignee of all rights in the present bi-zone water transport plate, and which patent is hereby incorporated herein by reference, discloses a method of forming an acceptable bubble barrier zone using a carbon black and a polymer binder at Column 13, line 34-line 59. In essence, eighty weight percent graphitized "VULCAN XC-72" carbon black and twenty weight percent dry "TEFLON-60", powder resin are mixed together for about twenty-five minutes, and the resulting mixture is applied to a porous plate, such as the water transport plate 68 across its reactive area 92 by a process similar to a process known in the art as a cloud process used to apply a catalyst layer to a substrate, as discussed in U.S. Pat. No. 4,177,159, and incorporated herein by reference, to a graphite loading of twelve mg./cm$^2$. The layer of graphitized carbon black and polymer resin is then compacted, such as by rolling at fifteen pounds p.s.i., and is then sintered in a forced convection oven at six hundred degrees Fahrenheit ("° F.") It has been found that such a layer of carbon black and a polymer binder applied to a porous plate, such as the porous water transport plate 68, develops a bubble pressure with a phosphoric acid electrolyte of about 5.5 p.s.i.

Such a layer of a graphitized carbon black and a polymer binder may be applied to the water transport plate 68 to form a bubble barrier zone over the entire reactive area 92 of the first contact surface 76 of the water, so that the depth of the bubble barrier zone is less than 25 percent of a shortest distance between the opposed first and second contact surfaces 76, 78. The bubble barrier zone may also be applied as in FIG. 3, to cover the first and second perimeter edges 98, 100 of the plate. A preferred bubble barrier zone 74 of the water transport plate 68 develops a bubble pressure of greater than 2 p.s.i. when pores within the bubble barrier zone are filled with water. It is to be understood that the bubble barrier zone 74 and other bubble barrier zones described herein may be applied as described to become integral with the water transport plat 68, or the bubble barrier zones may be fabricated to become a separate bubble barrier zone plate 52, 64 secured adjacent to a water permeability zone 54, 66 to become a bi-zone water transport plate 12, 14 of the fuel cell 10.

A second preferred or freeze reduction bubble barrier zone has a pore size of less than 10 nanometers so that a freezing temperature of water remaining in the pores is reduced as a result of capillary forces, as is known in the art. For example, as described in an article entitled "Melting of Ice in Porous Solids" by Rennie and Clifford, published in Volume 73 (1977) at Pages 680–689 of the "Journal of the Chemical Society, Faraday Transactions", a 10 degree Centigrade ("° C." reduction in freezing temperature in a structure where the pore diameter is 8 nanometers ("nm") or 80 angstroms ("A"). A 20° C. reduction in freezing temperature of water within pores of a structure having a pore diameter of 4 nm. As is well known, it is a great advantage to reduce a freezing temperature of water within a fuel cell, specially where the fuel cell is to power a transportation vehicle moving from temperate to sub-freezing ambient conditions, such as an automobile. Such a very fine pore freeze reduction bubble barrier zone may be formed on a water transport plate 68 by coating the plate 68 to a depth of less than 25 percent of a shortest distance between opposed first and second contact surfaces 76, 78 with a very fine carbon or silica having prime particle sizes of about 100 A in diameter. An alternative way is to laminate onto the reactive area 92, or between the first and second water permeable portions 130, 132 of a water transport plate 122 as shown in FIG. 5, a porous plastic layer wherein pores of the plastic layer are less than 10 nm in diameter. An acceptable plastic is a perfluorosulfonic acid as sold under the aforesaid "NAFION" trademark by the E.I. DuPont De Nemour Company.

Such a porous plastic layer having a pore size of less than 10 nm may be formed between the first and second water permeable portions 130, 132 of the water transport plate 122 shown in FIG. 5, by placing a "NAFION" film, having 4 nm pore size between the first and second water permeability portions 130, 132, and heating the three layer assembly to about 400° F. for about seven to twelve minutes while pressing the first and second portions 130, 132 together at about 100 p.s.i. or greater, and then cooling the assembly to less than 300° F. while maintaining the pressure.

It is pointed out that the freeze protection bubble barrier zone having a pore size of less than 10 nm has a much lower water permeability rate than the bubble barrier zones described above having a pore size of less than 20 microns. Therefore, a preferred thickness of the freeze protection bubble barrier zone is less than 5 percent of a shortest distance between opposed contact surfaces defined by the plate. Additionally, the pore size of a water permeability zone adjacent to a freeze protection bubble barrier zone is at least 1,000 (one thousand) percent greater than the pore size of the freeze protection bubble barrier zone.

Figure 8:
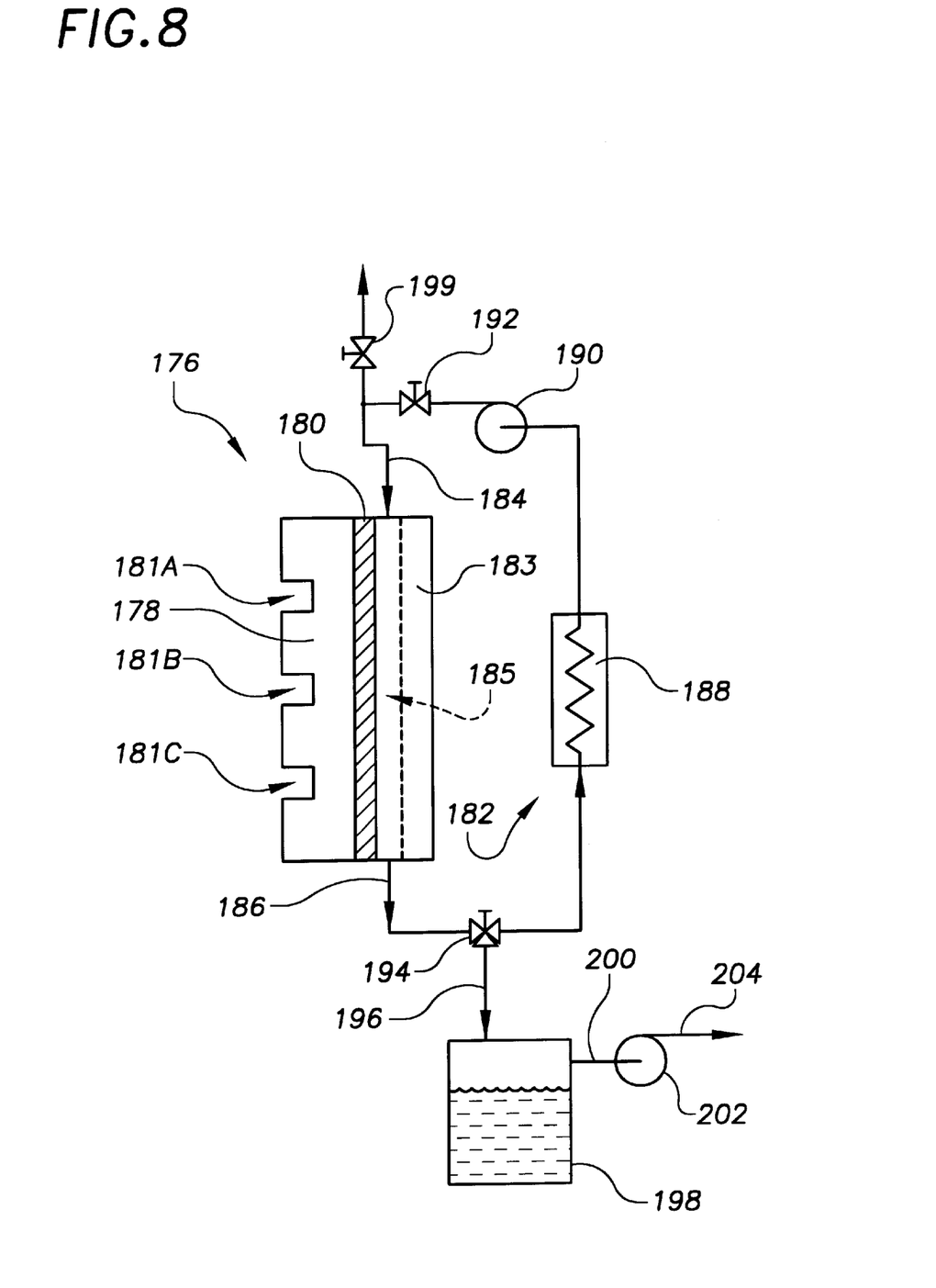
FIG. 8 is a cross-sectional, schematic of a bi-zone water transport plate, showing a coolant loop in fluid communication with the plate.

The freeze reduction bubble barrier zone is of substantial advantage in a bi-zone water transport plate of a fuel cell exposed to freezing ambient conditions. As shown in FIG. 8, such a bi-zone water transport plate 176 includes a water permeability zone 178 and a freeze reduction bubble barrier zone 180, with a plurality of reactant flow channels 181A, 181B, 181C defined within the water permeability zone 178. In a specific embodiment, the bi-zone water transport plate 176 having the freeze reduction bubble barrier zone 180 is in fluid communication with a coolant loop 182 by way of a cooler plate 183, containing at least one water channel 185, which coolant loop 182 is common to fuel cell power plants. The coolant loop 182 includes a coolant feed line 184 that directs a coolant liquid into the cooler plate 183. A coolant discharge line 186 directs liquid coolant and any product water passing through the bi-zone water transport plate 176 out of the cooler plate 183, through a coolant heat exchanger 188 to remove heat from the liquid coolant, to a coolant pump 190 secured between the coolant discharge line 186 and coolant feed line 184 that pumps the liquid coolant through the coolant loop 182.

As is well known in the art, the coolant feed line 184 and discharge line 186 would also include manifolding (not shown) common to fuel cells. A coolant flow valve 192 may be secured between the coolant pump 190 and the bi-zone water transport plate 176 on the coolant feed line 184 to control flow of the coolant liquid into the cooler plate 183 and to control pressure of the liquid coolant within the coolant loop 182. The coolant loop 182 also includes a coolant drain valve 194 secured to the coolant discharge line 186 that may selectively direct the liquid coolant to flow from the coolant discharge line 186 through a coolant drain line 196 into a coolant accumulator 198, for example whenever a fuel cell utilizing the bi-zone water transport plate 176 with the freeze reduction bubble barrier zone 180 is shut down. The coolant feed line 184 may also include a vent valve 199 which is used during gravity drainage of the coolant loop 182. The coolant accumulator 198 includes a vacuum line 200 secured to a vacuum pump 202 that applies a specific suction or vacuum force to the accumulator 198 and through the coolant drain 196 and discharge lines 186 to the bi-zone water transport plate 176 and the cooler plate 183. The vacuum pump 202 discharges fluid from the accumulator 198 through an accumulator vent 204.

During steady-state operation of the bi-zone water transport plate 176 having a freeze reduction bubble barrier zone 180 in fluid communication with the coolant loop 182, the coolant drain valve 194 is set to direct the coolant to flow from the bi-zone water transport plate 176 through the cooler plate 183 and the coolant discharge line 186, coolant heat exchanger 188, to be pumped by the coolant pump 190 through the coolant feed line 184 and coolant flow valve 192 back into the cooler plate 183 to fill pores defined within the water permeability zone 178 and freeze reduction bubble barrier zone 180 while removing heat from the plate 176. Whenever a fuel cell using the bi-zone water transport plate 176 is to be shut down while exposed to freezing ambient conditions, the coolant pump 190 is shut down, the vent valve 199 is opened, and the coolant drain valve is set to direct gravity drainage of liquid coolant from the coolant discharge line 186, coolant heat exchanger 188, coolant pump 190, coolant feed line 184 through the coolant drain line 196 into the coolant accumulator 198.

As is well-known, liquid coolant will be held by capillary forces within pores of the water permeability zone 178 and the freeze reduction bubble barrier zone 180 and therefore will not gravity drain into the accumulator 198. The capillary force holding the liquid within the pores is a function of the diameter of the pores, wherein the smaller the pores, the greater the capillary force holding the liquid coolant within the pores. Therefore, the vacuum pump 202 is selectively controlled whenever necessary, for example during a fuel cell shut down, to apply a vacuum force to the bi-zone water transport plate 176 that is greater than the capillary force of the pores within the water permeability zone 178 and less than the capillary force of the pores within the freeze reduction bubble barrier zone 180 so that the vacuum pump effectively removes liquid from the water permeability zone 178, but not from the freeze reduction bubble barrier zone 180.

A known relationship between capillary force and a pore size of a fine pore wet seal is that a pressure differential that can be sustained between a gaseous and a liquid fluid on opposed sides of the wet seal without breaking the seal is that the seal will tolerate a pressure differential on opposed sides approximately equal to $\Delta P=30/D$, where the pressure is in pounds per square inch ("p.s.i.") and "D" is the pore size, or pore diameter in microns. For example, if the smallest pores within the water permeability zone were 10 microns in diameter, a vacuum force applied by the vacuum pump 202 of at least 3 p.s.i. must be applied to the bi-zone water transport plate 176 to withdraw the liquid coolant such as water from those pores. Because the freeze reduction bubble barrier zone 180 includes only pores having a pore size of less than 10 nm, the freezing point of the liquid coolant remaining within the bubble barrier zone 178 is reduced by about 8° C.

Therefore, the bi-zone water transport plate 176 utilizing a freeze reduction bubble barrier zone 180 with a coolant loop 182 having a vacuum pump capable of applying during a shutdown procedure a vacuum force to the plate 176 that is greater than the capillary force of the pores within the water permeability zone 178 and less than the capillary force of the pores within the freeze reduction bubble barrier zone 180, will greatly facilitate use of the plate 176 in association with a fuel cell 10 that is operated in sub-freezing ambient conditions. Because the freeze reduction bubble barrier zone 180 remains filled with freeze resistant liquid coolant, shutdown and startup procedures will be expedited, while minimizing a risk of mechanical damage of the plate 176 due to expansion of water within the water permeability zone 178 upon freezing.

In manufacturing the porous carbon body that may be utilized to form the bi-zone water transport plate 68 of FIG. 2, as well as the other embodiments disclosed above, the plate 68 may also be manufactured to increase its wettability either before or after application of the bubble barrier zone 74 by methods well-known in the art. For example, U.S. Pat. No. 5,840,414 that issued on Nov. 24, 1998 to Bett et al., which patent is owned by the assignee of all rights in the present bi-zone water transport plate and which patent is hereby incorporated herein by reference, shows a porous carbon body that achieves increased wettability by incorporation of a metal oxide into the pores of the body, wherein the metal oxide has a solubility in water of less than about $10^{-6}$ moles per liter.

In operation of the fuel cell 10 utilizing the anode and cathode bi-zone water transport plates 12, 14, an acceptable gas seal can be sustained by the anode bubble barrier zone 52 and cathode bubble barrier zone 74 while rates of water permeability through the plates 12, and 14 may be significantly increased resulting in less costly manufacture, lower total mass of the plates 12, 14 and more efficient operation of the cell 10. Additionally, the bi-zone water transport plates 12, 14 also achieve enhanced freeze tolerance even if the freeze reduction bubble barrier zone 180 embodiment is not utilized. During shutdown of the fuel cell in sub-freezing ambient conditions, drainage of water from the fuel cell 10 will be required to avoid mechanical damage to cell components resulting from expansion of water upon freezing. Because the pore size of the water permeability zones 54, 66 of the plates 12, 14 may be larger than prior porous water transport plates that achieve the same bubble pressure, the water will be more readily withdrawn under an applied vacuum from the pores of the water permeability zone during such a freezing-condition shutdown.

While the present invention has been described and illustrated with respect to particular embodiments of a bi-zone water transport plate for a fuel cell, it is to be understood that the present invention is not to be limited to the described and illustrated embodiments. For example, although the bi-zone water transport plate of the present invention has been primarily described in the context of a "PEM" fuel cell, the bi-zone water transport plate is applicable to other fuel cells utilizing other solid polymer or aqueous electrolytes. Further, although FIG. 1 shows schematically a single fuel cell including two bi-zone water transport plates 12, 14 of the present invention, the invention includes usage of the bi-zone water transport plates 12, 14 also as any component in a fuel cell 10 that must provide a gaseous fluid seal in a surface and liquid fluid permeability through the same surface. Additionally, as described above the bubble barrier zones 52, 64 may be fabricated to be integral with the water permeability zones 54, 66, or the bubble barrier zones described herein may be separated bubble barrier zone plates 52, 64 secured adjacent to the water permeability zones 54, 66 to form a bi-zone water transport plates 12, 14. The invention also includes use of the bi-zone water transport plates in a plurality of fuel cells cooperatively secured in a well known fuel cell stack. Accordingly, reference should be made primarily to the following claims rather than the foregoing description to determine the scope of the invention.

What is claimed is:

1. A bi-zone water transport plate for a fuel cell having a proton exchange membrane electrolyte, an anode catalyst and a cathode catalyst secured on opposed sides of the electrolyte, the bi-zone water transport plate comprising:

a. a water permeability zone secured in fluid communication with the electrolyte;

b. a bubble barrier zone secured to the water permeability zone and secured in fluid communication with the electrolyte, for directing flow of product water from the cathode catalyst through the plate, and;
   i. wherein the bubble barrier zone extends between all reactive perimeters of the plate, has liquid filled pores having a pore size of less than 20 microns, and has a thickness of less than 25 per cent of a shortest distance between opposed contact surfaces defined by the plate; and,
   ii. the water permeability zone has a mean pore size of at least 100 per cent greater than the pore size of the bubble barrier zone, and has a thickness of greater than 75 per cent of the shortest distance between the opposed contact surfaces.

2. The bi-zone water transport plate for a fuel cell of claim 1, wherein the bubble barrier zone has a pore size of less than 5 microns and the water permeability zone has a pore size of between about 10–20 microns.

3. The bi-zone water transport plate for a fuel cell of claim 2, wherein the bubble barrier zone has a thickness of between about 0.010–0.025 centimeters, and the water permeability zone has a thickness of between 0.075–0.200 centimeters.

4. The bi-zone water transport plate for a fuel cell of claim 1, wherein the bubble barrier zone is secured between a first water permeability zone portion and a second water permeability zone portion of the water permeability zone.

5. The bi-zone water transport plate for a fuel cell of claim 1, wherein the bubble barrier zone completely overlies a perimeter edge defined by the plate to form an edge seal of the plate.

6. The bi-zone water transport plate for a fuel cell of claim 1, wherein the bubble barrier zone is a carbon polymer mixture bubble barrier zone having a bubble pressure greater than 2 p.s.i.

7. The bi-zone water transport plate for a fuel cell of claim 6, wherein the polymer is selected from the group consisting of polytetrafluoroethylene, perfluorosulfonic acid, phenolic, epoxy, polysulfone, and polyvinylidine fluoride.

8. The bi-zone water transport plate for a fuel cell of claim 1, wherein the bubble barrier zone is a freeze reduction bubble barrier zone having a pore size of less than 10 nanometers, and having a thickness that is less than 5 percent of the shortest distance between opposed contact surfaces defined by the plate.

9. The bi-zone water transport plate for a fuel cell of claim 8, wherein the freeze reduction bubble barrier zone consists of a porous plastic layer having pores with a pore size of less than 10 nanometers.

10. The bi-zone water transport plate for a fuel cell of claim 9, wherein the porous plastic layer is perfluorosulfonic acid.

11. The bi-zone water transport plate for a fuel cell of claim 9, wherein the porous plastic layer is secured between a first water permeable portion and a second water permeable portion of the water transport plate.

12. The bi-zone water transport plate for a fuel cell of claim 8, wherein the bi-zone water transport plate is in fluid communication with a coolant loop that directs a coolant liquid adjacent the plate and the coolant loop includes a vacuum pump that selectively applies a vacuum force through the coolant loop to the bi-zone water transport plate that is greater than a capillary force of pores within the water permeability zone and that is less than a capillary force of pores within the freeze reduction bubble barrier zone, so that the vacuum pump effectively removes coolant liquid from the water permeability zone, but does not remove coolant liquid from the freeze reduction bubble barrier zone.

13. A bi-zone water transport plate for a fuel cell having a proton exchange membrane electrolyte, an anode catalyst and a cathode catalyst secured on opposed sides of the electrolyte, a porous electrode substrate secured in fluid communication with each catalyst, the bi-zone water transport plate comprising:
a. a water permeability zone secured in fluid communication communication with the electrode substrate;
b. a bubble barrier zone secured to the water permeability zone and secured in fluid communication with the electrode substrate, for directing flow of product water from the cathode catalyst through the plate, and;
   i. wherein the bubble barrier zone extends between all reactive perimeters of the plate, has liquid filled pores having a pore size of about 25 to 50 per cent of a pore size of the water permeability zone, and has a thickness of less than 25 per cent of a shortest distance between opposed contact surfaces defined by the plate; and,
   ii. the water permeability zone has a mean pore size of about 40 per cent of a pore size of the porous electrode substrate, and has a thickness of greater than 75 per cent of the shortest distance between the opposed contact surfaces defined by the plate.

14. The bi-zone water transport plate for a fuel cell of claim 13, wherein the bubble barrier zone is a carbon polymer mixture bubble barrier zone having a bubble pressure greater than 2 p.s.i.

15. The bi-zone water transport plate for a fuel cell of claim 14, wherein the polymer is selected from the group consisting of polytetrafluoroethylene, perfluorosulfonic acid, phenolic, epoxy, polysulfone, and polyvinylidine fluoride.

16. The bi-zone water transport plate for a fuel cell of claim 13, wherein the bubble barrier zone is a freeze reduction bubble barrier zone having a pore size of less than 10 nanometers.

17. The bi-zone water transport plate for a fuel cell of claim 16, wherein the freeze reduction bubble barrier zone consists of a porous plastic layer having pores with a pore size of less than 10 nanometers.

18. The bi-zone water transport plate for a fuel cell of claim 17, wherein the porous plastic layer is secured between a first water permeable portion and a second water permeable portion of the water transport plate.

19. The bi-zone water transport plate for a fuel cell of claim 16, wherein the bi-zone water transport plate is in fluid communication with a coolant loop that directs a coolant liquid adjacent the plate and the coolant loop includes a vacuum pump that selectively applies a vacuum force through the coolant loop to the bi-zone water transport plate that is greater than a capillary force of pores within the water permeability zone and that is less than a capillary force of pores within the freeze reduction bubble barrier zone, so that the vacuum pump effectively removes coolant liquid from the water permeability zone, but does not remove coolant liquid from the freeze reduction bubble barrier zone.

20. A method of enhancing freeze protection of a fuel cell having an electrolyte, an anode catalyst and a cathode catalyst secured on opposed sides of the electrolyte, comprising the steps of:
a. securing in fluid communication with the electrolyte a bi-zone water transport plate having a freeze reduction bubble barrier zone with a pore size of less than 10 nanometers and having a water permeability zone with a pore size at least 1,000 percent greater than the pore size of the freeze reduction bubble barrier zone;

b. operating the fuel cell so that pores within the freeze reduction bubble barrier zone and water permeability zone become filled with a coolant liquid; and, c. shutting down the fuel cell including selectively applying a vacuum force to the bi-zone water transport plate that is greater than a capillary force of pores within the water permeability zone and that is less than a capillary force of pores within the freeze reduction bubble barrier zone, so that the vacuum force effectively removes coolant liquid from the water permeability zone, but does not remove coolant liquid from the freeze reduction bubble barrier zone.

21. A method of enhancing freeze protection of a fuel cell having a proton exchange membrane electrolyte, an anode catalyst and a cathode catalyst secured on opposed sides of the electrolyte, comprising the steps of:

a. securing in fluid communication with the electrolyte a bi-zone water transport plate having a water permeability zone and a bubble barrier zone secured to the water permeability zone, wherein the bubble barrier zone directs flow of product water from the cathode catalyst through the plate, extends between all reactive perimeters of the plate, has liquid filled pores having a pore size of less than 20 microns, and has a thickness of less than 25 per cent of a shortest distance between opposed contact surfaces defined by the plate, and wherein the water permeability zone has a mean pore size of at least 100 per cent greater than the pore size of the bubble barrier zone, and has a thickness of greater than 75 per cent of the shortest distance between the opposed contact surfaces;

b. operating the fuel cell so that pores within the bubble barrier zone and water permeability zone become filled with a coolant liquid; and, c. shutting down the fuel cell including applying a vacuum force to the bi-zone water transport plate to remove water from the pores of the water permeability zone.

* * * * *